(12) United States Patent
Grimwade et al.

(10) Patent No.: US 8,899,257 B2
(45) Date of Patent: Dec. 2, 2014

(54) DISC ASSEMBLY FOR A VALVE AND METHOD OF MAKING THE SAME

(75) Inventors: David Grimwade, Suffolk (GB); Kamyar Molavi, The Woodlands, TX (US); Ken McClymonds, The Woodlands, TX (US)

(73) Assignee: Amot Controls Corp., Houston, TX (US)

( * ) Notice: Subject to any disclaimer, the term of this patent is extended or adjusted under 35 U.S.C. 154(b) by 255 days.

(21) Appl. No.: 13/347,118

(22) Filed: Jan. 10, 2012

(65) Prior Publication Data

US 2013/0037737 A1 Feb. 14, 2013

Related U.S. Application Data

(60) Provisional application No. 61/521,582, filed on Aug. 9, 2011.

(51) Int. Cl.
*F16K 1/22* (2006.01)
*F16K 1/226* (2006.01)
*F02D 9/10* (2006.01)

(52) U.S. Cl.
CPC ............ *F16K 1/2261* (2013.01); *F02D 9/1015* (2013.01); *F02D 9/108* (2013.01)
USPC ........................ 137/15.25; 251/306

(58) Field of Classification Search
CPC ............ F16K 1/2261; F16K 1/22; F16K 1/46
USPC ........................ 251/305, 306, 307; 137/15.25
See application file for complete search history.

(56) References Cited

U.S. PATENT DOCUMENTS

| | | | | |
|---|---|---|---|---|
| 2,586,927 A | * | 2/1952 | Fantz | 251/306 |
| 2,886,062 A | * | 5/1959 | Wheatley | 137/527.8 |
| 2,934,312 A | * | 4/1960 | Stevens | 251/283 |
| 2,980,388 A | * | 4/1961 | White | 251/175 |
| 3,081,791 A | * | 3/1963 | Wheatley | 137/454.2 |
| 3,282,555 A | * | 11/1966 | Mallonee, II et al. | 251/84 |
| 3,343,805 A | * | 9/1967 | Felton | 251/306 |
| 3,902,697 A | * | 9/1975 | Robinson | 251/306 |
| 4,083,529 A | * | 4/1978 | Santy et al. | 251/175 |
| 5,685,520 A | * | 11/1997 | Velan | 251/306 |
| 5,707,040 A | * | 1/1998 | Gasaway | 251/306 |
| 7,895,989 B2 | * | 3/2011 | Bessho | 123/337 |
| 8,381,754 B2 | * | 2/2013 | Shenk | 137/15.25 |
| 2010/0276621 A1 | * | 11/2010 | Zwick | 251/305 |

FOREIGN PATENT DOCUMENTS

| | | | | | |
|---|---|---|---|---|---|
| GB | 2192255 A | * | 1/1988 | | F16K 25/00 |
| JP | 02195080 A | * | 8/1990 | | F16K 1/226 |

* cited by examiner

*Primary Examiner* — Stephen M Hepperle
*Assistant Examiner* — R. K. Arundale
(74) *Attorney, Agent, or Firm* — Caesar, Rivise, Bernstein, Cohen & Pokotilow, Ltd.

(57) ABSTRACT

A shutoff valve, e.g., an engine shutoff valve, is provided which includes a valve body having a fluid, e.g., air, passage and a disc assembly. The disc assembly is pivotable within the fluid passage from an open position to provide for free flow of fluid through the passage, to a closed position to provide a substantially closed off the fluid passage. The disc assembly includes a front disc, a rear disc, and a seal, e.g., a spring energized PTFE seal, disposed between the front disc and the rear disc. The front disc is permanently secured, e.g., welded, soldered or brazed, to the rear disc such that the seal is captured between the front disc and the rear disc.

14 Claims, 5 Drawing Sheets

DISC ASSEMBLY FOR A VALVE AND METHOD OF MAKING THE SAME

CROSS-REFERENCE TO RELATED APPLICATIONS

This application claims priority from Provisional Application Ser. No. 61/521,582, filed on Aug. 9, 2011, entitled Disc Assembly for a Butterfly Valve, which application is assigned to the same assignee as this application and whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

SPECIFICATION

1. Field of the Invention

The present invention relates generally to disc assemblies for valves and more particularly to disk assemblies for shutoff or regulator valves, such as engine shutoff valves, to prevent uncontrolled runaway of the engine.

2. Background of the Invention

Diesel engines, in the presence of combustible gases in the atmosphere, occasionally enter a runaway condition in which the engine, without a proper device to mitigate this problem, can enter an uncontrolled acceleration. In this condition, the engine experiences combustion and, if not stopped, the engine can reach speeds that can result in destruction and/or catastrophic engine failure, and personal injury. There are a number of causes of runaway including, for example, a faulty engine governor, engine overheating or the ingestion of unregulated hydrocarbons into the combustion chamber. Such hydrocarbons may be from an external source such as airborne gas, or from the engine itself due to a malfunction such as failure of turbocharger oil seals.

A conventional way to stop a diesel engine is to stop the flow of fuel to the combustion chamber. However, an alternate method must be employed to stop a diesel engine in the event of runaway. The most common method, used for many years, involves blocking the air supply to the combustion chamber of the engine. Once deprived of oxygen, the runaway ceases. Accordingly, safety valves which cut off the air supply to the engine have been developed to shut off the engine in such a situation.

One type of shut-off valve placed in the air intake to the engine employs a valve disc that is mechanically, hydraulically, or electrically biased to be in a closed position that blocks air supply to the combustion chamber. The spring loaded valve is held in an open position by a trip mechanism that is manually or power cocked to hold the valve in the open position. A solenoid or by other appropriate device may be used to actuate the trip mechanism to close the valve. When in the opened position, there is an unobstructed air supply to the engine. Upon runaway, the device is engaged (or disengaged), and the valve snaps into its closed position, thus cutting off the air supply to the combustion chamber, thereby starving the engine of oxygen such that the engine stalls.

Prior art discs for shutoff valves have typically been constructed of a single component having an elastomeric O-ring seated in an annular groove extending about the periphery of the disc. While this arrangement is generally suitable for its intended purposes, it is not particularly suitable for high temperature applications. In this regard in high temperature applications the O-ring may have a tendency to come out of the groove or melt and be carried into the engine.

Thus, a need exists for a valve disc having a peripheral seal which is suitable for high temperature applications. The subject invention addresses that need by making use of a temperature resistant seal, e.g., a spring energized PTFE seal, and a specially constructed disc assembly to accommodate that seal.

All references cited herein are incorporated herein by reference in their entireties.

BRIEF SUMMARY OF THE INVENTION

One aspect of this invention entails a shutoff or regulating valve is provided comprising a valve body having a fluid passage therein and a disc assembly for use in high temperature applications, e.g., as an air shutoff valve for an engine. The disc assembly is pivotable within the fluid passage from an open position wherein the disc assembly is positioned within the fluid passage to provide for free flow of fluid through the fluid passage, to a closed position wherein the disc assembly is positioned within the fluid passage to substantially close off the fluid passage. The disc assembly comprises a front disc component, a rear disc component and a seal, e.g., a spring energized PTFE seal, disposed between the front disc component and the rear disc component. The front disc component is permanently secured, e.g., welded, to the rear disc component such that the seal is captured between the front disc component and the rear disc component.

Another aspect of this invention comprises the method of making the shutoff or regulating valve disc assembly. That method basically entails providing a front disc component and a rear disc component, with one of the front disc component and the rear disc component having a recess located at the peripheral edge thereof, and with the other of the front disc component and the rear disc component comprising a confronting surface. The front disc component and the rear disc component are juxtaposed with respect to each other so that the recess and the confronting surface form an annular groove therebetween. The seal is provided in the annular groove and then the front disc component to the rear disc component are permanently secured, e.g., welded together, to capture the seal with the groove.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following embodiments, but it should be understood that the present invention is not deemed to be limited thereto.

The valve of the present invention is preferably designed to be assembled as part of the intake manifold of diesel engine. The basic concept of the valve is that it utilizes a manually or power latched disc held in the open (or run) position by an actuation trigger mechanism. The open or run position means that the disc is parallel with the intake airflow, allowing for free passage of intake air into the engine. The latched valve remains in the open position until such time as the valve is tripped, whereby the disc rotates 90° under the action of a mechanical (e.g., spring), hydraulic, or electrical force creating an airtight seal with the valve body. The restriction created by the closed disc fully throttles the engine, resulting in an engine shut down.

Figure 1:
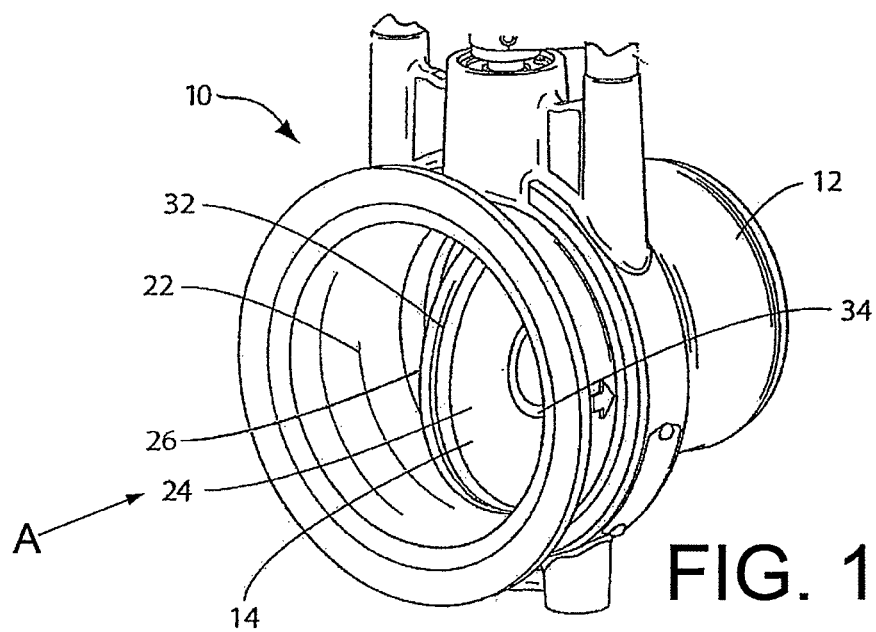
FIG. 1 is an isometric view of an air shutoff valve for an engine constructed in accordance with one preferred exemplary embodiment of the present invention.

Referring now to the drawing figures, wherein like part numbers refer to like elements throughout the several views, there is shown in FIG. 1, an air shutoff valve 10 for an engine in accordance with one exemplary, e.g., a butterfly valve, preferred embodiment of the present invention. The primary components of the air shutoff valve 10 relevant to the present invention include a valve body 12 and a disc assembly 14.

The disc assembly 14 is pivotable within an air passage 22 in the valve body 12 from an open position (i.e., normal operational position of the engine) shown in FIG. 1) to a closed position (not shown), wherein intake air to the engine is substantially blocked. As best seen in FIG. 1, when the valve is in the open position, the front face 24 and the rear face 26 of the disc assembly 14 are generally parallel to the direction of airflow A through the air passage 22 of the air shutoff valve 10, thereby allowing free flow of air through the valve. When the valve is in the closed position (e.g., when stopping the engine is desired), the front face 24 and the rear face 26 of the disc assembly 14 are perpendicular or substantially perpendicular to airflow A so that the airflow through the air passage 22 is substantially halted.

Figure 6:
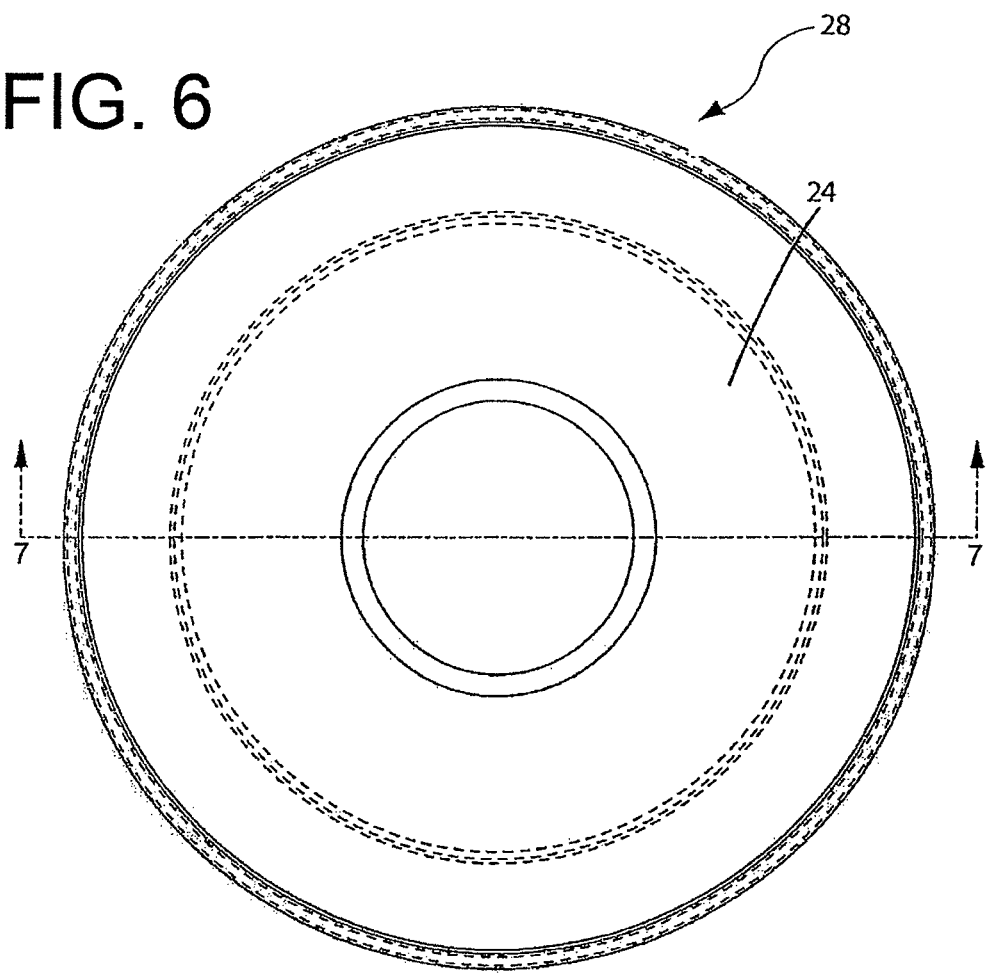
FIG. 6 is a front view of a front disc of the disc assembly of FIG. 2.
Figure 7:
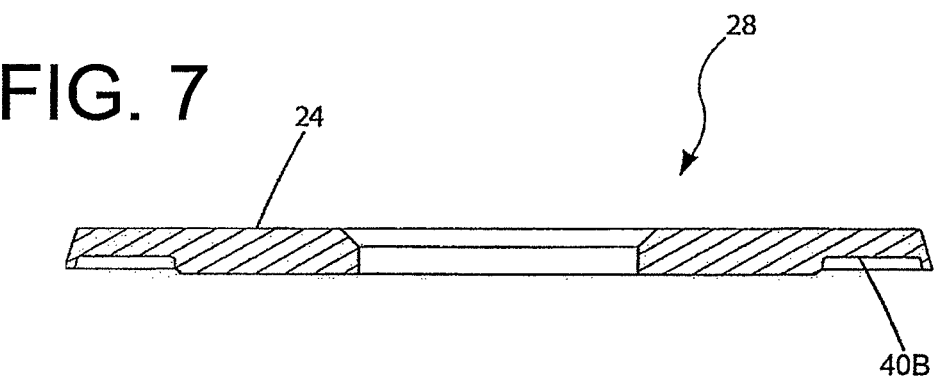
FIG. 7 is a cross-sectional view of the front disc of FIG. 6, taken substantially along lines 7-7 of FIG. 6.
Figure 8:
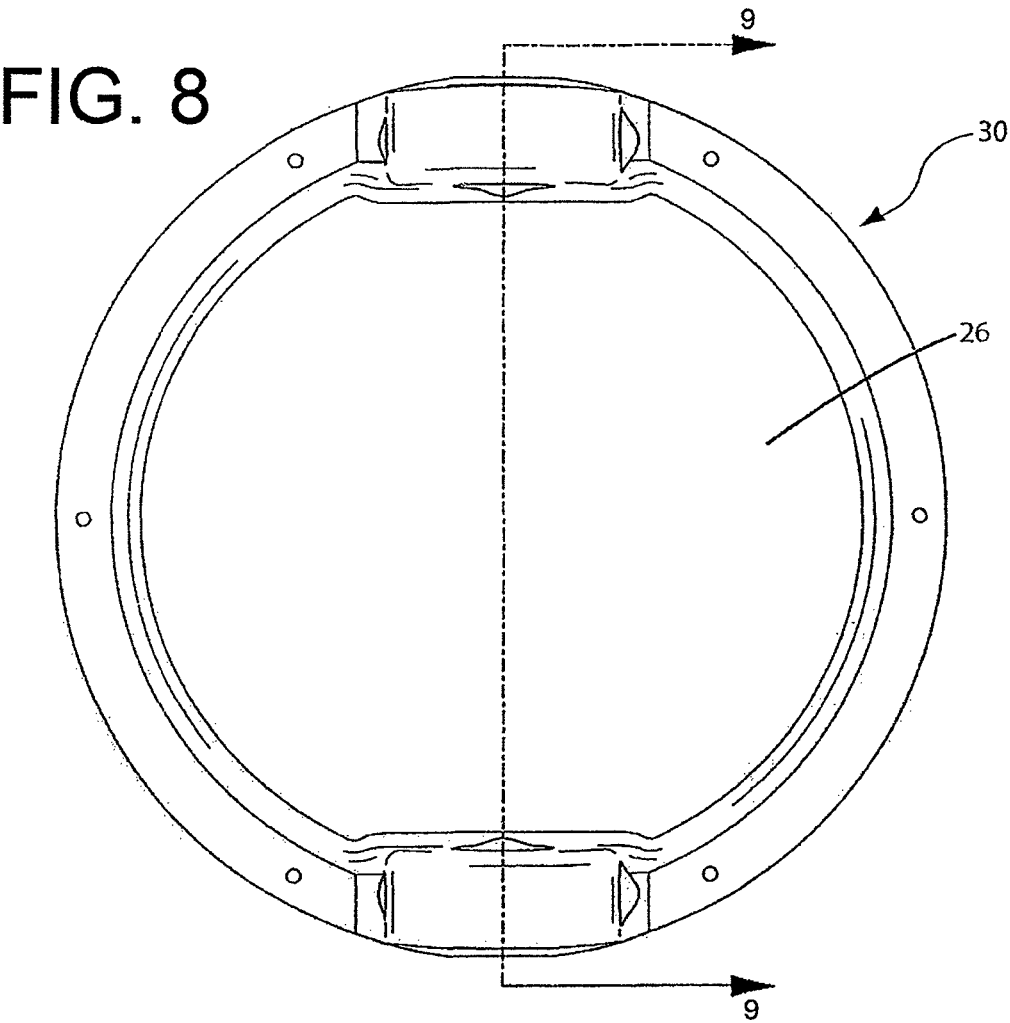
FIG. 8 is a rear view of a rear disc of the disc assembly of FIG. 2.
Figure 9:
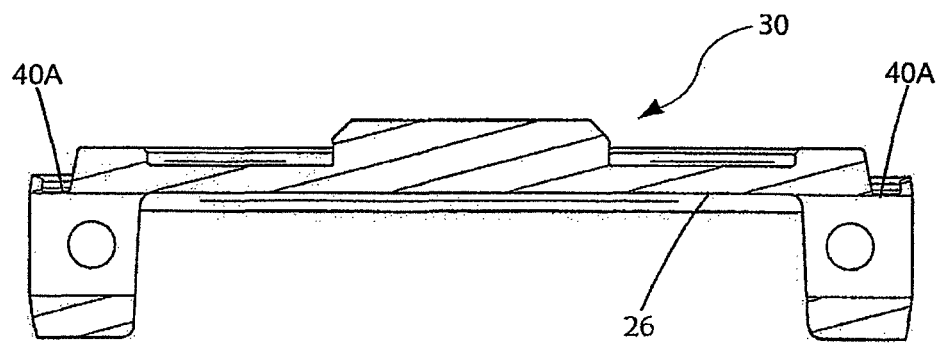
FIG. 9 is a cross-sectional view of the rear disc of FIG. 8, taken substantially along lines 9-9 of FIG. 8.

In the present invention, as best seen in FIGS. 2-5, the disc assembly 14 includes a front disc component 28, a rear disc component 30, and a seal 32. The front disc component 28 is shown in additional detail in FIGS. 6-7 and the rear disc component 30 is shown in additional detail in FIGS. 8-9. The seal 32 is disposed in an annular groove 40 (FIG. 5) extending about the periphery of the disc assembly. The groove is formed by recess 40A (FIG. 9) in the front surface of the rear disc 30 and a confronting surface 40B (FIG. 7) in the rear surface of the front disc 28. Thus, when the two components 28 and 30 are juxtaposed and in engagement with each other the groove 40 is formed at their interface.

Figure 2:
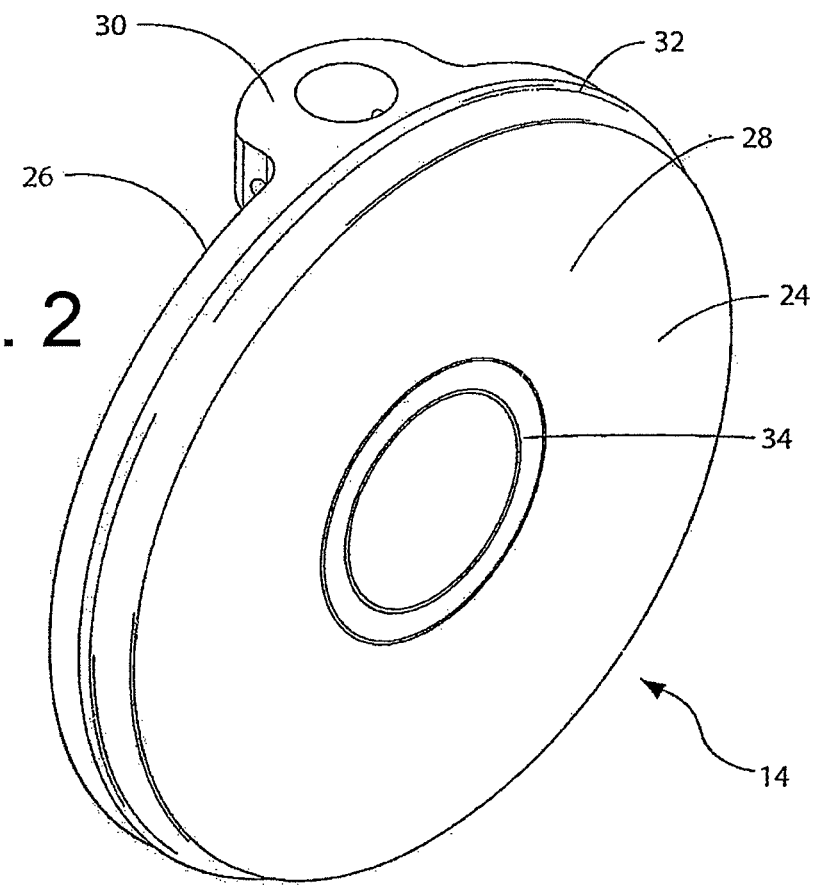
FIG. 2 is an isometric view of a disc assembly of the air shutoff valve for an engine of FIG. 1.
Figure 3:
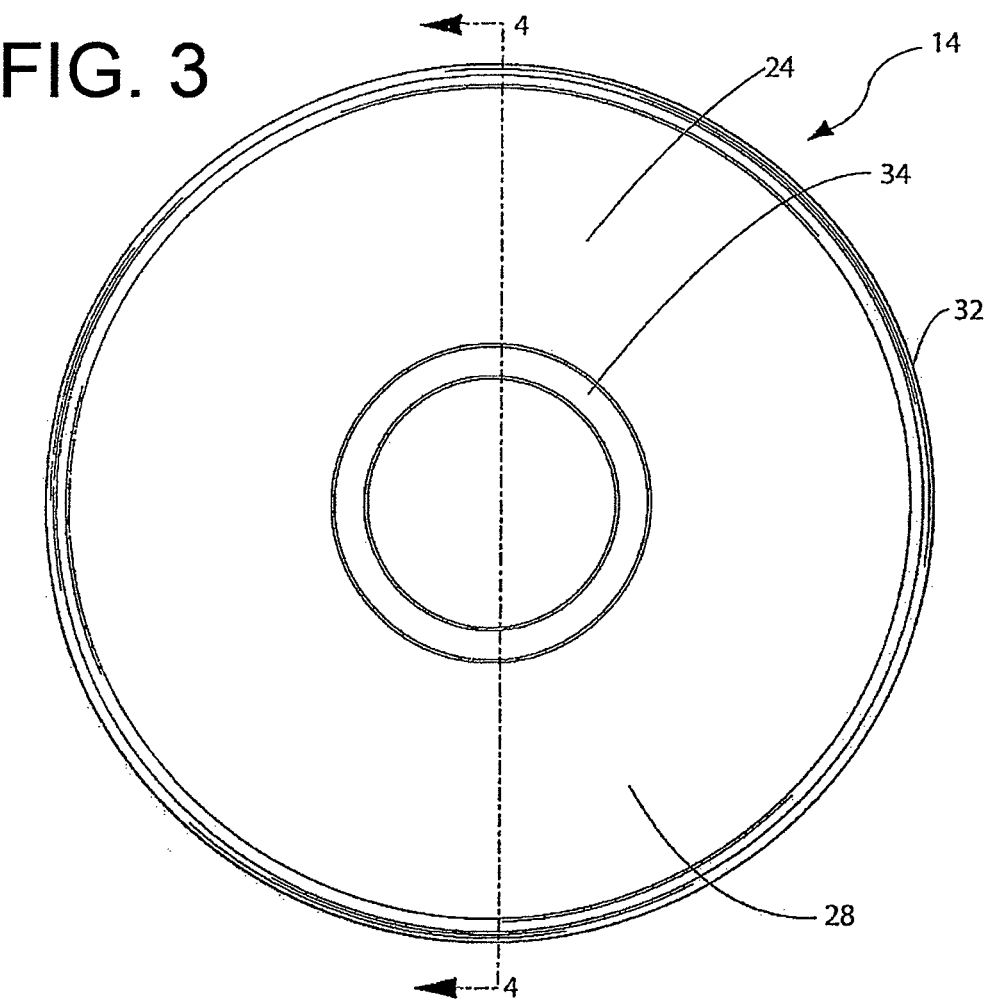
FIG. 3 is a front view of the disc assembly of FIG. 2.
Figure 4:
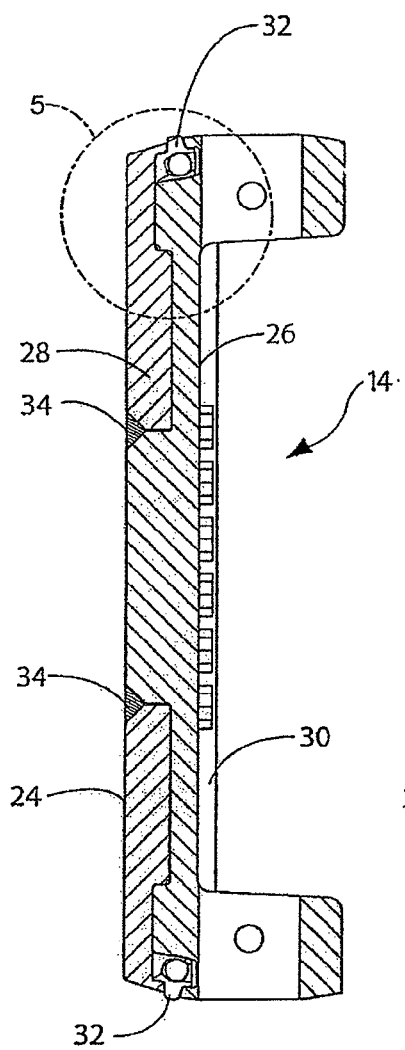
FIG. 4 is a cross-sectional view of the disc assembly of the air shutoff valve for an engine of FIG. 1, taken substantially along lines 4-4 of FIG. 3.
Figure 5:
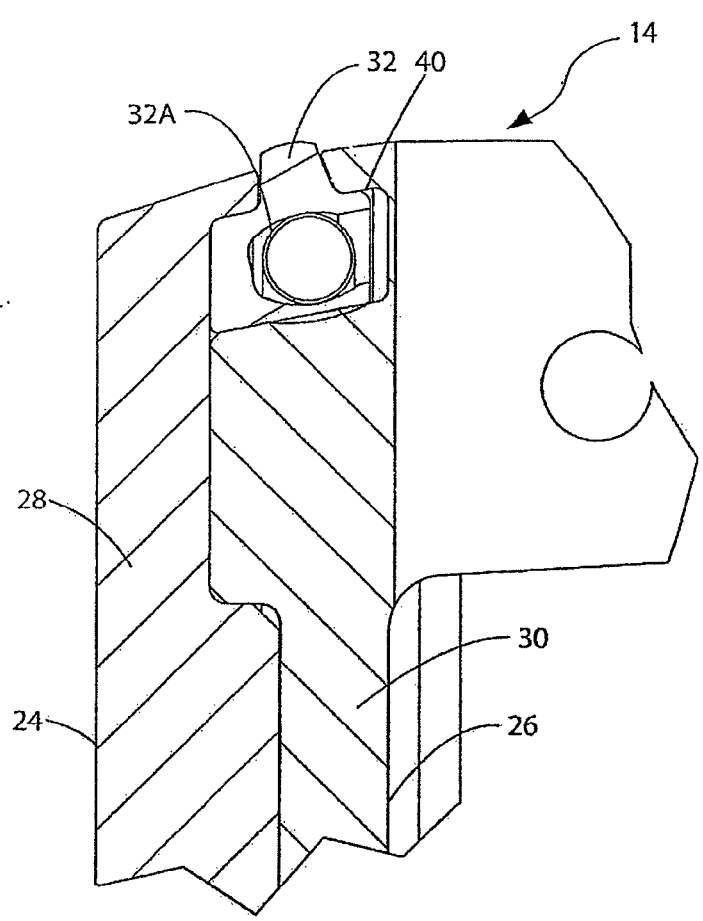
FIG. 5 is a partial detail, cross-sectional view of the disc assembly of FIG. 2, shown within the broken circular area designated as 5 in FIG. 4.

As best seen in FIGS. 2 and 4 and as is important to one aspect of the present invention, the front disc component 28 is fixedly secured, e.g., welded, to the rear disc component 30 along annular weld 34 such that the seal 32 is captured between the front disc component 28 and the rear disc component 30 to create a permanent and inseparable disc assembly 14 to prevent components from separating from the disc assembly and entering the air stream/engine during use of the valve. Besides welding, other methods can be used to joins the two components, such as soldering, brazing, etc. Also, the disc components can be designed to latch together in the assembled form in the valve to hold the seal in place In accordance with one preferred aspect of this invention the seal 32 is preferably a spring energized PTFE seal or any other high temperature resistant material seal, e.g., a polymeric or non-elastomeric seal. In the exemplary embodiment of the valve 10, the seal includes a spring 32A. Such spring energized PTFE seals 32 are well known and made, for example, by Bal Seal Engineering, Inc. It should be pointed out at this juncture that other seals, than the above exemplary seal, can be utilized so long as such seals are capable of high temperature operation and resistance to melting to prevent portions from melting away and gaining ingress into the engine during operation.

Since the spring energized PTFE seal 32 is not an elastomeric member, it cannot be stretched to be placed in an annular groove in the periphery of the disc (as has characterized the prior art). Thus, in order to position the seal 32 in a peripheral annular groove 40 in the disc assembly 14, that assembly is made up of the heretofore identified two components, namely the front disc component 28 and the rear disc component 30, which when assembled form the peripheral annular groove 40 at their interface. To that end, the exemplary embodiment of the rear disc component 30 as discussed above has a recessed surface 40A on which the spring energized PTFE seal 32 is placed. Then the other disc component, i.e., the front disc component 28, is fixedly secured, e.g., welded, to the rear disc component 30 so that the recessed surface 40A of the rear disc component 30 and the immediately adjacent juxtaposed and confronting surface 40B of the front disc component 28 conjoin to form the annular groove 40 and trap the seal 32 within that groove.

It should be pointed out at this juncture that in lieu of the disc component 30 including the recess to form the groove 40, the component 28 may include a recessed surface on which the seal 32 is placed. In fact, both components 28 and 30 may each include a recess or some surface feature such that when the two disc components are connected together they conjoin to form an annular recess in which the seal 32 can be disposed and then trapped in place by the permanent securement of those two disc components to each other. It should be noted that the subject invention contemplate the use of more than two components to make up the disc assembly, so long as those components can be initially juxtaposed for form an annular space (the precursor of the groove) in which the seal can be located and then the components assembled to form the groove and permanently lock the seal therein.

As will be appreciated by those skilled in the art since the disc assembly 14 is permanently secured together, with the seal trapped within the groove 40, it is suitable for high temperature applications without the risk of any portions or components of it becoming separated and gaining ingress into the engine (as is the case of the resilient O-rings of the prior art valves).

In operation of an engine on which the spring-bias air shutoff valve 10 that is constructed in accordance with the present invention is attached, the disc assembly 14 is normally in the open position, as described above. An actuator assembly (known to those skilled in the art) contains a trigger mechanism for actuating the valve when such action is desired. The actuator assembly may be pneumatic, hydraulic or electric in nature.

The present air shutoff valve 10 is designed to operate over a wide range of intake air temperatures, ranging from −40° F. (−40° C.) to over 500° F. (260° C.). The air shutoff valve 10 facilitates a complete engine stop by providing a substantially air tight shutoff of air to the intake manifold.

The basic valve design may be similar to, for example, AMOT Model 4261/4262 butterfly valves. The actuation trigger may be modular in design, facilitating actuation by pneumatic, hydraulic or electrical means.

The present invention operates in either "hard installations" such as but not limited to integral with aluminum piping, or "soft installations" such as but not limited to along rubber hoses. Each of the improvements described herein helps the valve to operate in high vibration and temperature environments.

It should be pointed out at this juncture that the subject invention can be used for other types of valves in addition to shut-off valves. Thus, this invention also entails regulating and control type valves, as well as shut-off valves. For example, the disclosed embodiment of the exemplary butterfly valve element can be controlled by an actuator (not shown) to stop at any predetermined position, and not just the fully closed or fully opened positions described above.

While the invention has been described in detail and with reference to specific embodiments thereof, it will be apparent to one skilled in the art that various changes and modification can be made therein without departing from the spirit and scope thereof.

What is claimed is:

1. A method of making a disc assembly for shutoff or regulating valve having a valve body with a fluid passage therein, the fluid passageway having an internal surface, the disc assembly being pivotable within the fluid passage from an open position wherein the disc assembly is positioned within the fluid passage to provide for free flow of fluid through the fluid passage, to a closed position wherein the disc assembly is positioned within the fluid passage to substantially close off the fluid passage, the method comprising:
    providing a front disc component;
    providing a rear disc component, one of the front disc component and the rear disc component having a recess located at the peripheral edge thereof, the other of the front disc component and the rear disc component comprising a confronting surface;
    juxtaposing the front disc component and the rear disc component adjacent each other to so that the recess and the confronting surface form an annular groove therebetween;
    providing a seal comprising a non-elastic polymeric member in the annular groove, whereupon only the non-elastic polymeric member is enabled to engage the internal surface of the fluid passageway when the disk assembly in the closed position, and wherein said seal comprises a spring energized PTFE seal; and
    permanently and inseparably securing the front disc component to the rear disc component to capture the seal with the groove prior to use.

2. The method of claim 1 wherein the rear disc component includes the recess.

3. The method of claim 1 wherein the front disc component and rear disc component are permanently secured together by welding, soldering or brazing.

4. The method of claim 1 the valve is an air shutoff valve for an engine and wherein the fluid passageway is an air passage for supplying air to the engine.

5. The method of claim 4 wherein the valve is a butterfly valve.

6. A shutoff or regulating valve for use with engines, comprising:
    (a) a valve body having a fluid passage therein, the fluid passageway having an internal surface; and
    (b) a disc assembly pivotable within the fluid passage from an open position wherein the disc assembly is positioned within the fluid passage to provide for free flow of fluid through the fluid passage, to a closed position wherein the disc assembly is positioned within the fluid passage to substantially close off the fluid passage, the disc assembly comprising a front disc component, a rear disc component and a seal disposed between the front disc component and the rear disc component, the front disc component being permanently and inseparably secured to the rear disc component prior to use such that the seal is located and captured in an annular groove between the front disc component and the rear disc component, the seal comprising a non-elastic polymeric member arranged so that only the non-elastic polymeric member of said seal is enabled to engage the internal surface of the fluid passageway when the disk assembly in the closed position, said seal comprising a spring energized PTFE seal.

7. The shutoff or regulating valve of claim 6 wherein at least one of the front disc component and the rear disc component comprises a recess located at the peripheral edge thereof, the other of the front disc component and the rear disc component comprises a surface located adjacent the recess to thereby form the annular groove, the annular groove extending about the periphery of the disc assembly.

8. The shutoff or regulating valve of claim 7 wherein the rear disc component includes the recess.

9. The shutoff or regulating valve of claim 6 wherein the front disc component and rear disc component are permanently and inseparably secured together a weldment, a solder joint or a brazed joint.

10. The shutoff or regulating valve of claim 6 wherein at least one of the front disc component and the rear disc component comprises a recess located at the peripheral edge thereof, the other of the front disc component and the rear disc component comprises a surface located adjacent the recess to thereby form the annular groove, the annular groove extending about the periphery of the disc assembly.

11. The shutoff or regulating valve of claim 10 wherein the rear disc component includes the recess.

12. The shutoff or regulating valve of claim 11 wherein the front disc component and rear disc component are permanently secured together by a weldment, a solder joint or a brazed joint.

13. The shutoff or regulating valve of claim 6 wherein the valve is an air shutoff valve for an engine and wherein the fluid passageway is an air passage for supplying air to the engine.

14. The shutoff or regulating valve of claim 13 wherein the valve is a butterfly valve.

* * * * *